United States Patent
Aburmad

(10) Patent No.: US 9,638,900 B2
(45) Date of Patent: May 2, 2017

(54) OPTICAL ARRANGEMENT USABLE FOR AN ULTRA WIDE BAND OPTICAL SENSOR

(75) Inventor: Shimon Aburmad, Nahariya (IL)

(73) Assignee: OPGAL OPTRONIC INDUSTRIES LTD., Karmiel (IL)

( * ) Notice: Subject to any disclaimer, the term of this patent is extended or adjusted under 35 U.S.C. 154(b) by 0 days.

(21) Appl. No.: 13/812,257

(22) PCT Filed: Oct. 10, 2011

(86) PCT No.: PCT/IB2011/054447
§ 371 (c)(1),
(2), (4) Date: Jul. 30, 2013

(87) PCT Pub. No.: WO2012/066431
PCT Pub. Date: May 24, 2012

(65) Prior Publication Data
US 2013/0301119 A1   Nov. 14, 2013

(30) Foreign Application Priority Data
Nov. 15, 2010 (IL) .......................... 209332

(51) Int. Cl.
*G02B 13/14* (2006.01)

(52) U.S. Cl.
CPC ......... *G02B 13/143* (2013.01); *G02B 13/146* (2013.01)

(58) Field of Classification Search
CPC .... G02B 13/14; G02B 13/008; G02B 13/143; G02B 13/24; G03F 7/70233
USPC ............... 359/355, 350, 353, 356–357, 361, 359/365–366, 657–659, 592–593, 359/671–672, 682, 690, 722, 727, 359/729–731, 733, 754–756, 761, 770
See application file for complete search history.

(56) References Cited

U.S. PATENT DOCUMENTS 6,208,459 B1   3/2001   Coon et al.
6,999,243 B2*  2/2006   Chipper ................. G02B 15/14
                                              359/354

(Continued)

FOREIGN PATENT DOCUMENTS

EP         0683411      11/1995

OTHER PUBLICATIONS

Jamieson Thomas H. "Decade Wide Waveband Optics", Proceedings of SPIE, EPIE, US, vol. 3482, Jun. 8, 1998, pp. 306-320, XP002623025, ISSN: 0277-786X, DOI: 10.1117/12.322018.

(Continued)

*Primary Examiner* — James Greece
(74) *Attorney, Agent, or Firm* — Pearl Cohen Zedek Latzer Baratz LLP

(57) ABSTRACT

An optical arrangement of lenses configured for use with an ultra wide band optical sensor is provided herein. The optical arrangement is associated with a back focal plane and further includes a first, a second, a third, a fourth, a fifth, and a sixth lens ordered from first to sixth along a common optical axis such that the first lens is farthest from the back focal plane and the sixth lens is closest to the back focal plane, wherein the first and the second lenses are made of zinc sulfide, the third and the sixth lenses are made of barium fluoride, the fourth lens is made of magnesium oxide, and the fifth lens is made of calcium fluoride, and wherein the lenses are selected to transfer any light within a wavelength range that contains 0.42 μm to 3.6 μm.

11 Claims, 3 Drawing Sheets

(56) References Cited

U.S. PATENT DOCUMENTS

| | | | |
|---|---|---|---|
| 8,369,008 B2* | 2/2013 | Forestier | G02B 13/146 |
| | | | 359/353 |
| 8,553,320 B2* | 10/2013 | Saito | G02B 1/04 |
| | | | 359/357 |
| 2003/0214729 A1* | 11/2003 | Wiese | G02B 27/0012 |
| | | | 359/754 |
| 2005/0259330 A1* | 11/2005 | Neil | G02B 13/14 |
| | | | 359/676 |
| 2006/0028713 A1* | 2/2006 | Hall | G02B 13/14 |
| | | | 359/357 |
| 2007/0133107 A1* | 6/2007 | Ohzawa | G02B 13/06 |
| | | | 359/749 |
| 2009/0080093 A1* | 3/2009 | Ning | G02B 13/06 |
| | | | 359/753 |
| 2009/0219631 A1* | 9/2009 | Ning | G02B 9/60 |
| | | | 359/716 |
| 2011/0051229 A1 | 3/2011 | Alexay | |
| 2011/0228383 A1* | 9/2011 | Cook | 359/356 |

OTHER PUBLICATIONS

International Search Report of PCT Application No. PCT/IB2011/054447 mailed on Mar. 30, 2012.
Extended European Search Report of EP Application No. 14743316.3, dated Aug. 8, 2016.
Sparrold Scott et al.: "Refractive lens design for simultaneous SWIR and LWIR imaging", Infrared Technology and Applications, vol. 8012, No. 1, May 13, 2011, pp. 1-18.
R L Sinclair et al.: "Broadband Lens Design for SWIR/MWJR Applications", Infrared Technology and Applications, vol. 3061, Aug. 13, 1997, pp. 376-386.

* cited by examiner

OPTICAL ARRANGEMENT USABLE FOR AN ULTRA WIDE BAND OPTICAL SENSOR

CROSS-REFERENCE TO RELATED APPLICATIONS

This application is a National Phase Application of PCT International Application No. PCT/IB2011/054447, International Filing Date Oct. 10, 2011, entitled "AN OPTICAL ARRANGEMENT USABLE FOR AN ULTRA WIDE BAND OPTICAL SENSOR" published on May 24, 2012 as International Publication No. WO 2012/066431, claiming priority of Israeli Patent Application No. 209332, filed Nov. 15, 2010, which are hereby incorporated by reference.

BACKGROUND

1. Technical Field

The present invention relates to optical instruments and more particularly, to optical instruments that are used for imaging and have an ultra wide band operation range.

2. Discussion of the Related Art

Optical instruments with an ultra wide band have many applications. For example, imaging devices such as cameras that may be effectively operable within a wide range of lighting conditions. One exemplary non-limiting application is a camera in use with airplanes configured to capture a video of the landing lights along runways. Such a camera needs to be able to be fully operable in daylight conditions but also in harsh weather conditions. Consequently, it has to operate both in the visible light range with a wavelength spanning from 0.35 μm to 0.7 μm but also along the Infra Red (IR) range spanning from 0.7 μm to 4 μm and beyond.

Ultra wide band imaging sensors in the 0.4 μm-5 μm are being developed but are difficult to accommodate with suitable optical arrangements. Due to their properties they impose strict optical and mechanical design requirements on the optical arrangements that accompany them. For example, in order to meet specified design requirements of field of view and resolution, a specified back focal length is required. The back focal length requirement is sometimes difficult to address due to the fact that optical instruments that are operable within the IR range require certain modules that need to be located between the optical arrangement and the imaging sensor. Such modules, such as a cold shield and a shutter have minimal dimensions that may extend well beyond the required back focal length of the optical arrangement.

Other constraints due to the wide spectral band of the aforementioned requirements necessitate a use of a plurality of sensors (each covering a different spectral range) and also relate to different heat radiation absorption mechanism of IR sensors.

Mirror based solutions for the aforementioned design challenges are known in the art. However, there are no lens-based optical arrangements that are known to address the strict optical and dimensional limitations imposed by ultra wide bend optical sensors.

BRIEF SUMMARY

It is therefore, the object of embodiments of the present invention, to overcome the drawbacks of the existing art and to provide an optical arrangement that addresses the design requirements of ultra wide band imaging sensors.

One aspect of the invention provides an optical arrangement of lenses configured for use with an ultra wide band optical sensor. The optical arrangement includes a first, a second, a third, a fourth, a fifth, and a sixth lens ordered from first to sixth along a common optical axis such that the first lens farthest from the focal plane and the sixth lens is closest to the focal plane. The first and the second lenses are made of zinc sulfide, the third and the sixth lenses are made of barium fluoride, the fourth lens is made of magnesium oxide, and the fifth lens is made of calcium fluoride. Additionally, the lenses are located in specified locations along the common optical axis and are further associated each with specified radii, wherein the specified locations and the specified radii are selected such that the optical arrangement is associated with a field of view that is greater than 20°.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
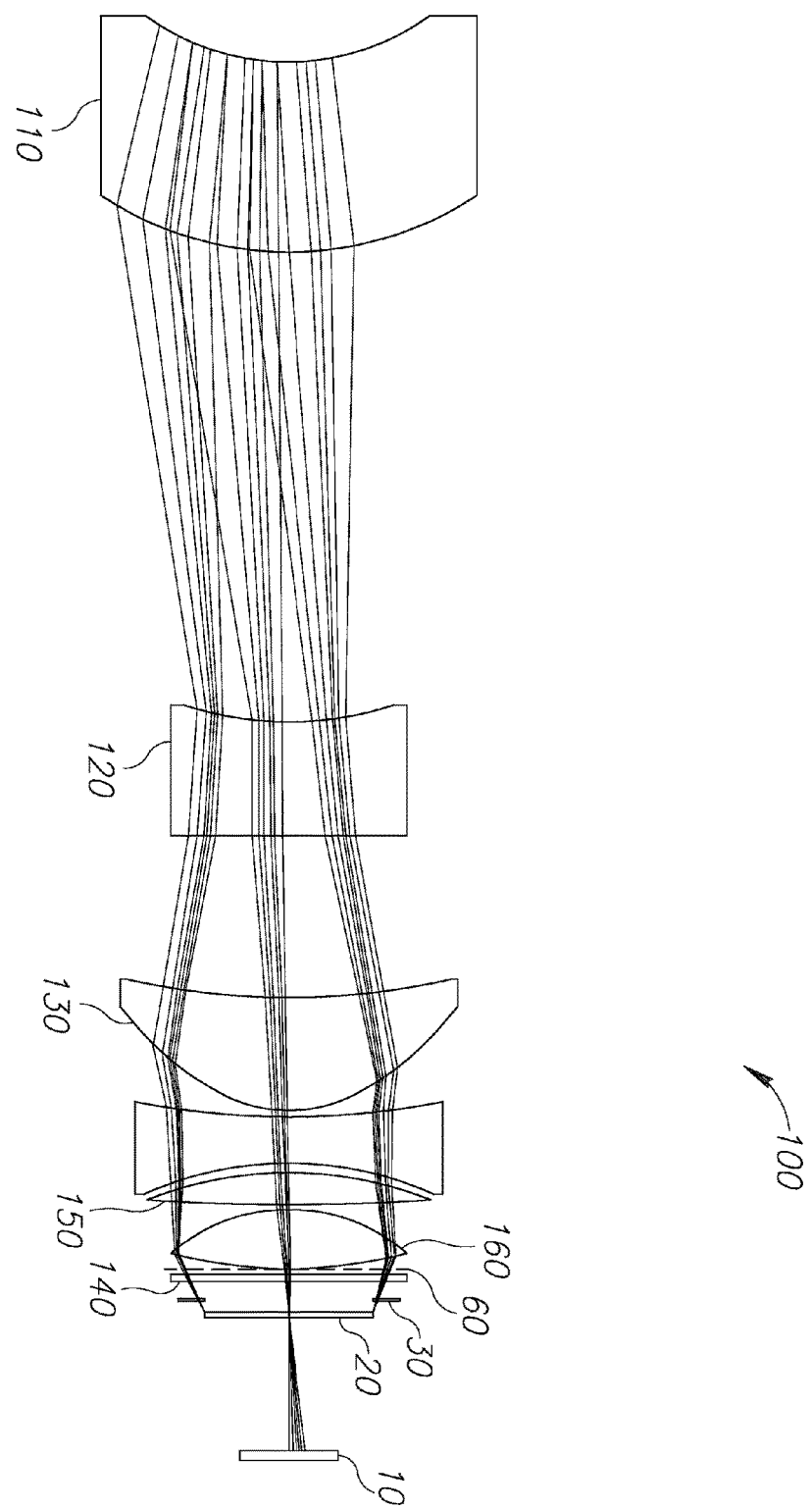
FIG. 1 is a schematic diagram illustrating an exemplary optical arrangement in accordance with one embodiment of the invention.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a schematic diagram illustrating an exemplary optical arrangement that is usable with an ultra wide band optical sensor 10 in accordance with one embodiment of the invention. An optical instrument 100 may include an optical arrangement of lenses associated with a focal plane and further including a first lens 110, a second lens 120, a third lens 130, a bi-concave lens 135, a fourth lens 140, a fifth lens 150, and a sixth lens 160 ordered from first to sixth along a common optical axis such that the first lens farthest from the focal plane and the sixth lens is closest to the focal plane. The optical characteristics of the lenses are selected such that all the lenses are fully transitive to an ultra wide band that contains visible light and infrared and further that they accommodate to the optical constraints imposed by the ultra wide band optical sensor 10.

The applicant has discovered, through simulations and experimentations, that a specified order of lenses, each of a specifically selected martial, yields an optical arrangement that meet the strict design requirements imposed by the use of ultra wide band optical sensor 10. Specifically, the order of the materials is as follows: the first and the second lenses 110 and 120 are made of zinc sulfide (aka Cleartran™), the third and the sixth lenses 130 and 160 are made of barium fluoride, the fourth lens 140 is made of magnesium oxide, and the fifth lens is made of calcium fluoride 150.

The applicant has discovered that by the virtue of the selection of the aforementioned materials, in the selected order of the lenses, the optical arrangement may transfer any light within a wavelength range that contains 0.42 µm to 3.6 µm. this range contains visible light, near infrared, and mid infrared. Other designs of shorter and longer wavelength are also possible with the aforementioned use of materials.

Additionally, the lenses are located in specified locations along the common optical axis and are further associated each with specified radii, wherein the specified locations and the specified radii are selected such that the optical arrangement is associated with a field of view that is greater than 20°.

Consistent with one embodiment of the invention, the specified locations and the specified radii of the lenses are further selected such that the optical arrangement has a focal length of between 12 mm to 18 mm. It is understood, that once the aforementioned order of the materials of the lenses is set, many configurations of radii and locations may be specified, usually using simulation tools known in the art.

Consistent with one embodiment of the invention, the optical arrangement has a back focal length greater than 20 mm. This length is necessary to accommodate a non uniformity correction module such s a shutter 50, a cold shield 30 and a cold filter 20 associated with the ultra wide band optical sensor 10 located at the focal plane. It should be noted that cold shield 30 impose a significant dimensional constraint due to its relative size.

Consistent with one embodiment of the invention, the first lens 110 may be a negative meniscus, the second lens 120 may be a plano-concave, the third lens 130 may be a positive meniscus, the fourth lens 140 may be a negative meniscus, the fifth lens 150 may be a plano-convex, and the sixth lens 160 may be a positive meniscus.

Consistent with one embodiment of the invention, optical instrument 100 may be used as an imaging device having an ultra wide range of wavelength. In an imaging device configuration, optical instrument 100 includes an optical sensor 10 located at the focal plane, a cold filter 20, a cold shield 30, a window 40, and a non-uniformity correction module (e.g. a shutter) 50 located between the optical sensor and the sixth lens, wherein the optical sensor 10 is configured to sense any light within a wavelength range that contains 0.42 µm to 3.6 µm.

Figure 2:
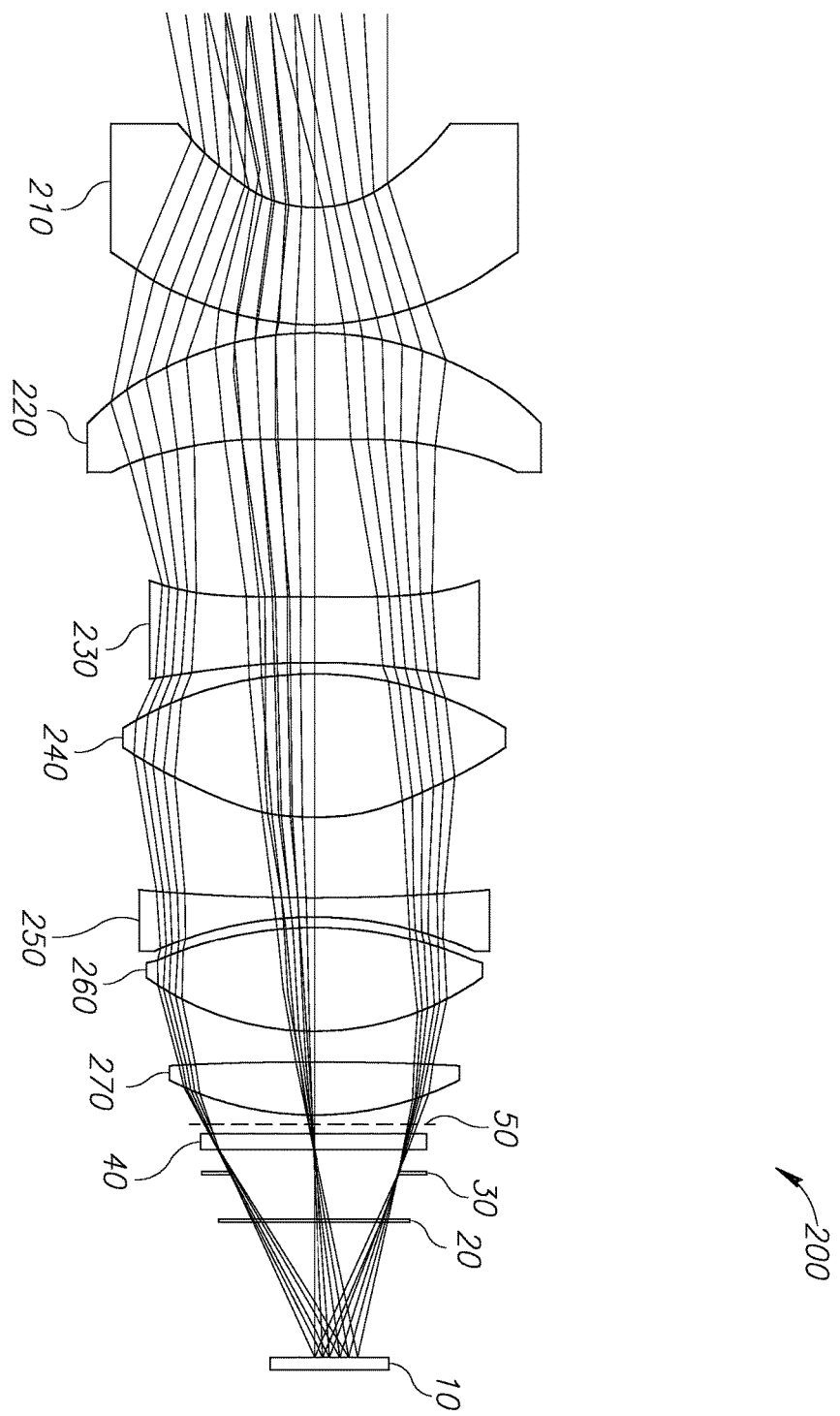
FIG. 2 is a schematic diagram illustrating an exemplary optical arrangement in accordance with another embodiment of the invention.

FIG. 2 is a schematic diagram illustrating an exemplary optical arrangement in accordance with another embodiment of the invention. In addition to the aforementioned arrangement of six lenses 110-160 optical arrangement 200 further includes a seventh lens 170 located between the first lens 110 and the second lens 120. The applicant has discovered in simulations and experimentations that the use of a seventh lens may be used and selected such that optical arrangement 200 has a field of view greater than 30°. Specifically, in order to achieve the improved performance over the six lenses design, the seventh lens 170 is made of zinc sulfide and possible shaped as a positive meniscus. More specifically, the specified location and the specified radii of the seventh lens 170 are further selected such that the optical arrangement has a focal length of between 12 mm to 18 mm and a back focal length greater than 20 mm. Optical instrument 200 having the seventh lens 170 present greater leverage in accommodating the cold shield and the shutter as the back focal length is greater than in the six lenses configuration.

Figure 3:
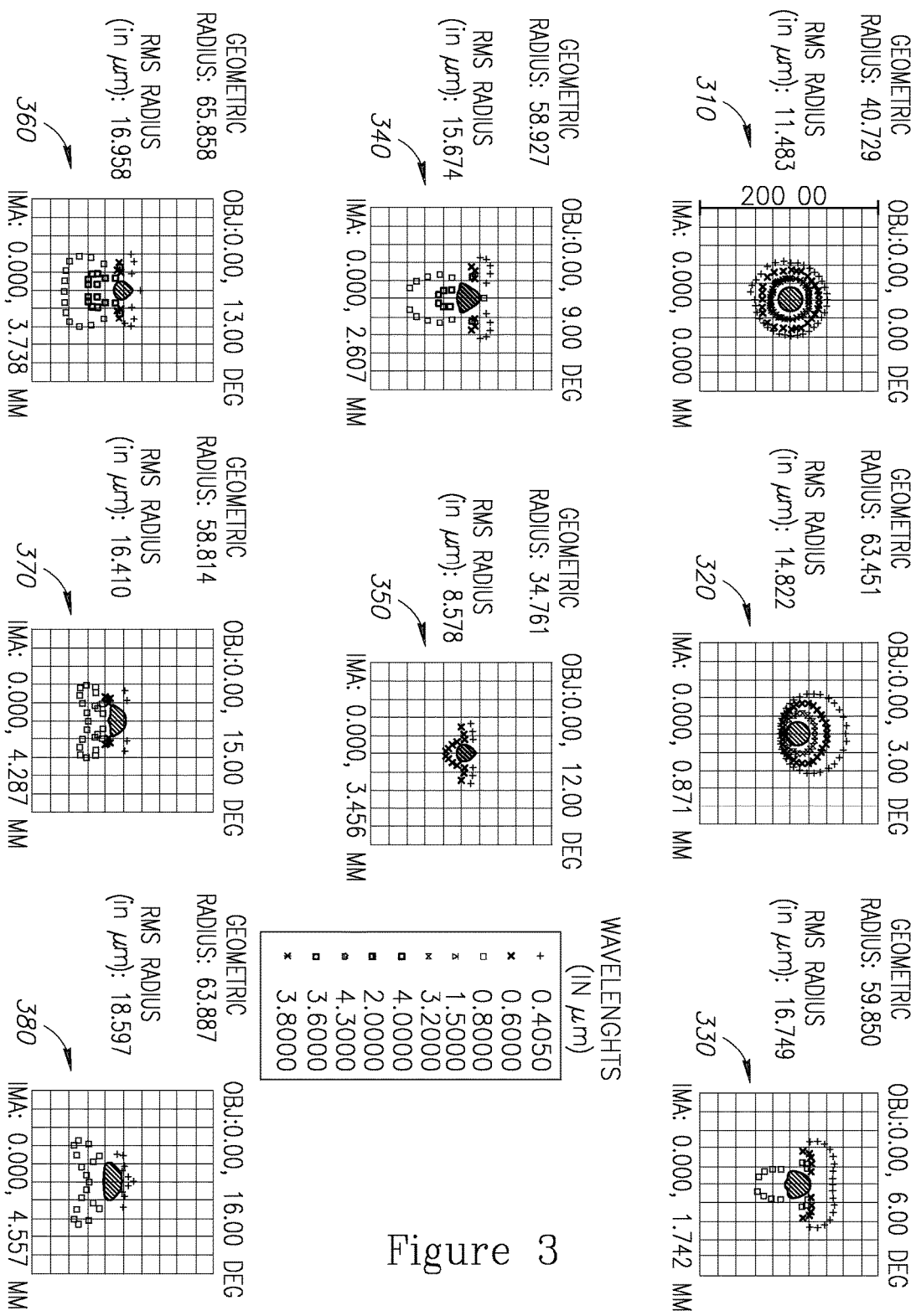
FIG. 3 shows spot diagrams illustrating aspects regarding the optical properties of the optical arrangement according to some embodiments of the present invention.

FIG. 3 shows spot diagrams 310-380 illustrating aspects regarding the optical properties of the optical arrangement according to some embodiments of the present invention. Spot diagrams are used to show the blur caused by the optical arrangement and serve as both qualitative and quantitative criteria for the optical performance of the optical arrangement. Each spot diagram shows how a small spot at the object plane is shown on the focal plane for different wavelength spanning from 0.4 µm to 3.8. Further, each one of spot diagrams 310-380 is shown of a different degree diverted from the optical axis, and both the geometric radius and the Root Mean Square (RMS) radius, being the radius of a spot that contains 95% of the energy of the beam entering the optical arrangement.

The applicant has discovered, during simulations and experimentations, that the aforementioned selection of materials of the lenses put in a specified order and specified locations yield significantly better results in optical terms. For example, and as clearly shown in the spot diagrams in spot diagram 350 associated with a field of view of 24°, the RMS radius is 8.578 µm whereas the radius of the light beam entering the optical arrangement is 30 mm. Similarly, in spot diagram 370 associated with a field of view of 30°, the RMS radius is 16.410 µm whereas the radius of the light beam entering the optical arrangement is 30 mm.

These performances illustrate that the aforementioned selection of materials of the lenses put in a specified order and specified locations yields, on top of meeting the physical dimension required for accommodating the cold shield and the shutter between the lens and the optical sensor, minimal blur in terms of optical quality of the light beam.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention.

What is claimed is:

1. An optical instrument comprising:
   an optical arrangement of lenses associated with a back focal plane and further comprising a first, a second, a third, a fourth, a fifth, and a sixth lens ordered from first to sixth along a common optical axis such that the first lens is farthest from the back focal plane and the sixth lens is closest to the back focal plane,
   wherein the first and the second lenses are made of zinc sulfide, the third and the sixth lenses are made of barium fluoride, the fourth lens is made of magnesium oxide, and the fifth lens is made of calcium fluoride, and
   wherein the lenses are selected to transfer any light within a wavelength range that contains 0.42 μm to 3.6 μm, and wherein the lenses are located in specified locations along the common optical axis and are further associated each with specified radii, wherein the specified locations and the specified radii are further selected such that the optical arrangement has a focal length of between 12 mm to 20 mm and a back focal length greater than 20 mm,
   wherein the optical arrangement of lenses has an f-number of 0.7 to 1.4.

2. The optical instrument according to claim 1, wherein the lenses are located in specified locations along the common optical axis and are further associated each with specified radii, wherein the specified locations and the specified radii are further selected such that the sixth lens and the back focal plane are sufficiently spaced from each other to accommodate a shutter and a cold shield associated with an infra red sensor located on the back focal plane.

3. The optical instrument according to claim 1, wherein the lenses are located in specified locations along the common optical axis and are further associated each with specified radii, wherein the specified locations and the specified radii are selected such that the optical arrangement is associated with a field of view that is greater than 20°.

4. The optical instrument according to claim 1, further comprising an optical sensor located at the back focal plane, a cold shield, and a shutter located between the optical sensor and the sixth lens, wherein the optical sensor is configured to sense any light within a wavelength range that contains 0.42 μm to 3.6 μm.

5. The optical instrument according to claim 1, wherein the lenses are selected such that 95% of an energy of a light beam entering the optical arrangement are contained within a spot at the back focal plane, which has a width of less than 1700% of the width of the light beam entering the optical arrangement.

6. The optical arrangement according to claim 4, wherein the optical arrangement has a field of view of at least 20°.

7. The optical instrument according to claim 1, further comprising a seventh lens located between the first lens and the second lens, wherein the seventh lens is selected such that the optical arrangement has a field of view greater than 30°.

8. The optical instrument according to claim 7, wherein the seventh lens is made of zinc sulfide.

9. The optical instrument according to claim 7, wherein the lenses are located in specified locations along the common optical axis and are further associated each with specified radii, wherein the specified locations and the specified radii are further selected such that the sixth lens and the focal plane are sufficiently spaced from each other to accommodate a shutter and a cold shield associated with an infra red sensor located on the back focal plane.

10. The optical instrument according to claim 7, further comprising an optical sensor located at the focal plane; a cold shield; and a shutter located between the optical sensor and the sixth lens, wherein the optical sensor is configured to sense any light within a wavelength range that contains 0.42 μm to 3.6 μm.

11. The optical instrument according to claim 7, wherein the lenses are selected such that 95% of an energy of a light beam entering the optical arrangement are contained within a spot at the back plane, which has a width of less than 1700% of the width of the light beam entering the optical arrangement.

* * * * *